(12) United States Patent
Taniguchi et al.

(10) Patent No.: US 9,275,537 B2
(45) Date of Patent: Mar. 1, 2016

(54) INTER-COMMUNICATION SYSTEM AND NOTIFICATION METHOD FOR INTER-COMMUNICATION SYSTEM

(71) Applicant: PANASONIC CORPORATION, Osaka (JP)

(72) Inventors: Syouhei Taniguchi, Kanagawa (JP); Hirotaka Fukutsuka, Fukuoka (JP); Ryosuke Kitago, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/508,729

(22) Filed: Oct. 7, 2014

(65) Prior Publication Data
US 2015/0022354 A1 Jan. 22, 2015

Related U.S. Application Data

(62) Division of application No. 13/579,537, filed as application No. PCT/JP2011/000903 on Feb. 18, 2011, now Pat. No. 8,884,758.

(30) Foreign Application Priority Data

Feb. 19, 2010 (JP) ................................. 2010-034478

(51) Int. Cl.
*G08B 21/00* (2006.01)
*G08B 21/22* (2006.01)
(Continued)

(52) U.S. Cl.
CPC ............ *G08B 21/22* (2013.01); *G06K 9/00496* (2013.01); *G07G 1/01* (2013.01); *G07G 1/12* (2013.01); *H04L 51/24* (2013.01); *H04N 7/183* (2013.01); *H04R 1/10* (2013.01)

(58) Field of Classification Search
CPC .................................... G07G 1/01; G07G 1/12
USPC .................. 340/540, 541, 10.1, 10.2, 286.06, 340/286.09; 445/41.1, 66.1, 552.1, 558
See application file for complete search history.

(56) References Cited

U.S. PATENT DOCUMENTS 6,087,927 A * 7/2000 Battistini et al. ......... 340/286.09
6,661,997 B2    12/2003 Ogo
(Continued)

FOREIGN PATENT DOCUMENTS

CN    101339687    1/2009
CN    101539988    9/2009
(Continued)

OTHER PUBLICATIONS

International Search Report dated May 10, 2011.
(Continued)

*Primary Examiner* — Tai T Nguyen
(74) *Attorney, Agent, or Firm* — Dickinson Wright PLLC

(57) ABSTRACT

An inter-communication system has a security functionality capable of reporting incidents such as abnormalities occurring in a security system. In an inter-communication system, if a communication sound control device receives an alarm from a security system via a main shop processing device, the communication sound control device notifies a predetermined order reception communication device, such as a manager communication device, of the reception of the alarm, and the main shop processing device reports to a preset destination over a communication network.

14 Claims, 3 Drawing Sheets

(51) Int. Cl.
*G07G 1/01* (2006.01)
*G07G 1/12* (2006.01)
*G06K 9/00* (2006.01)
*H04L 12/58* (2006.01)
*H04N 7/18* (2006.01)
*H04R 1/10* (2006.01)

(56) References Cited

U.S. PATENT DOCUMENTS

| | | | |
|---|---|---|---|
| 2001/0002467 A1 | 5/2001 | Ogo | |
| 2003/0021426 A1 | 1/2003 | Oogo | |
| 2004/0205825 A1* | 10/2004 | Kawabe et al. | 725/108 |
| 2006/0117362 A1* | 6/2006 | Jones et al. | 725/105 |
| 2008/0303902 A1 | 12/2008 | Romer | |
| 2010/0039253 A1 | 2/2010 | Zang | |

FOREIGN PATENT DOCUMENTS

| | | |
|---|---|---|
| JP | 2001-155259 | 6/2001 |
| JP | 2001-307225 | 11/2001 |
| JP | 2003-169127 | 6/2003 |
| JP | 2005-270200 | 10/2005 |
| JP | 2007-34441 | 2/2007 |
| JP | 2008-242824 | 10/2008 |
| JP | 2010-213988 | 9/2010 |

OTHER PUBLICATIONS

Chinese Office Action dated Nov. 8, 2013.
Search Report from annex of Chinese Office Action dated Nov. 8, 2013 with English translation.
Notification of Transmittal of Translation of the International Preliminary Report on Patentability dated Sep. 27, 2012.
Japanese Office Action dated Jan. 27, 2015.
Japanese Office Action dated Aug. 25, 2015.

* cited by examiner

INTER-COMMUNICATION SYSTEM AND NOTIFICATION METHOD FOR INTER-COMMUNICATION SYSTEM

RELATED APPLICATIONS

This application is a divisional application of application Ser. No. 13/579,537 (U.S. Pat. No. 8,884,758), filed Aug. 16, 2012, which claims the benefit of Japanese Patent Application No. 2010-034478, filed on Feb. 19, 2010, which is a national phase of PCT/JP 2011/000903 filed Feb. 18, 2011, the entire content of each of which is incorporated herein by reference.

TECHNICAL FIELD

The present invention relates to an inter-communication system with security functionality.

BACKGROUND ART

A conventional inter-communication system used as an order-taking system is such that a shop employee wearing a headset comprised of a microphone and headphones interacts with and takes an order from a customer driving to the shop, and tells the order to a kitchen.

CITATION LIST

Patent Literature

Patent Literature 1: Japanese Patent Laid-Open No. 2001-155259

SUMMARY OF INVENTION

Technical Problem

Unfortunately, such a conventional inter-communication system has no security functionality. An abnormal situation or an event potentially leading to an abnormality (hereinafter simply referred to as an "event") occurring in the shop cannot be reported to a specific person(s) such as a shop manager, nor shared among all inter-communication equipment users. In addition, since such a conventional inter-communication system does not interface with a security system, alarm information detected in the security system cannot be utilized in the inter-communication system.

For example, if an alarm is set to be heard across the shop upon detection of an abnormality in the security system, the alarm may stimulate a culprit to increase danger or to panic customers. Conversely, if an alarm is not set to be heard, an abnormality may not be noticed until a person such as the manager checks the state on a display of the security system. The manager may therefore fail to address the situation promptly, which may increase the trouble.

An object of the present invention, which has been made in view of the above inconveniences, is to provide an inter-communication system that enables an abnormal situation or an event potentially leading to an abnormality to be reported to a specific person(s) or shared only among inter-communication equipment users.

Solution to Problem

An inter-communication system of the present invention comprises: a plurality of order reception communication devices; and a communication sound control device that communicates with each of the plurality of order reception communication devices, wherein one of the plurality of order reception communication devices notifies the communication sound control device of an occurrence of an event, and the communication sound control device receives the notification of the occurrence of the event and notifies one or more order reception communication devices predetermined among the plurality of order reception communication devices of the occurrence of the event.

Another aspect of the present invention is an inter-communication system comprising: a plurality of order reception communication devices; a communication sound control device that communicates with each of the plurality of order reception communication devices; and a reception device that is connected to the communication sound control device and receives alarm information from a security system, wherein, when the reception device receives the alarm information from the security system, the communication sound control device notifies an order reception communication device from among the plurality of order reception communication devices of the reception of the alarm information.

Still another aspect of the present invention is an inter-communication system comprising: a plurality of order reception communication devices; a communication sound control device that communicates with each of the plurality of order reception communication devices; and an accounting device that is connected to the communication sound control device and performs accounting, wherein, when specific processing is performed in the accounting device, the communication sound control device notifies an order reception communication device predetermined from among the plurality of order reception communication devices of the occurrence of the specific processing.

Still another aspect of the present invention is an inter-communication system comprising: a plurality of order reception communication devices; a communication sound control device that communicates with each of the plurality of order reception communication devices; and a report communication device that is connected to the communication sound control device and reports to an external network, wherein one of the plurality of order reception communication devices notifies the communication sound control device of an occurrence of an event, the communication sound control device receives the notification of the occurrence of the event and notifies the report communication device of the occurrence of the event, and the report communication device transmits an e-mail notifying of the occurrence of the event to a preset e-mail address via the external network.

In the above inter-communication systems, the one order reception communication device may notify the communication sound control device of the occurrence of the event while transmitting data to the communication sound control device for requesting to forcibly disconnect wireless connection with other connecting order reception communication devices and to connect with the one order reception communication device.

In the above inter-communication systems, when no wireless transmission channels are available for communication by the one order reception communication device, the one order reception communication device may transmit data to the communication sound control device in response to the occurrence of the event for requesting to connect with the one order reception communication device.

The above inter-communication systems may further comprise a control unit that selects either a mode in which sound is sent to the predetermined order reception communication device through an operation on an order reception communication device that has received the notification, or a mode in which sending of sound is determined without requiring an operation on the order reception communication device that has received the notification.

In the above inter-communication systems, in response to an operation different from a normal reporting operation in pressing duration and/or in the number of presses performed on an operation unit provided in the one order reception communication device, the control unit may select the mode in which sending of sound is determined without requiring an operation on the order reception communication device that has received the notification.

Still another aspect of the present invention is an inter-communication system comprising: a plurality of order reception communication devices; a communication sound control device that communicates with each of the plurality of order reception communication devices; a reception device that is connected to the communication sound control device and receives alarm information from a security system; and a report communication device that reports to an external network, wherein, when the reception device receives the alarm information from the security system, the communication sound control device notifies an order reception communication device predetermined from among the plurality of order reception communication devices of the reception of the alarm information, and the report communication device transmits an e-mail notifying of the reception of the alarm information to a preset e-mail address via the external network.

Still another aspect of the present invention is an inter-communication system comprising: a plurality of order reception communication devices; a communication sound control device that communicates with each of the plurality of order reception communication devices; an accounting device that is connected to the communication sound control device and performs accounting; and a report communication device that reports to an external network, wherein, when specific processing is performed in the accounting device, the communication sound control device notifies an order reception communication device predetermined from among the plurality of order reception communication devices of the occurrence of the specific processing, and the report communication device transmits an e-mail notifying of the occurrence of the specific processing to a preset e-mail address via the external network.

An event occurrence notification method in an inter-communication system comprising a plurality of order reception communication devices communicating via a communication sound control device of the present invention includes the steps of: one of the plurality of order reception communication devices notifying the communication sound control device of an occurrence of an event; the communication sound control device receiving the notification of the occurrence of the event from the order reception communication device; the communication sound control device determining an order reception communication device to which the received notification of the occurrence of the event is to be transferred among the plurality of order reception communication device; and the communication sound control device notifying the determined order reception communication device of the occurrence of the event in the inter-communication system.

Another aspect of the present invention is an event occurrence notification method in an inter-communication system comprising: a plurality of order reception communication devices; a communication sound control device that communicates with each of the plurality of order reception communication devices; and a reception device that is connected to the communication sound control device and receives alarm information from a security system, wherein the method includes the steps of: the reception device receiving the alarm information from the security system; and the communication sound control device notifying one or more order reception communication devices predetermined among the plurality of order reception communication devices of the reception of the alarm information from the security system.

Still another aspect of the present invention is an event occurrence notification method in an inter-communication system comprising: a plurality of order reception communication devices; a communication sound control device that communicates with each of the plurality of order reception communication devices; and an accounting device that is connected to the communication sound control device and performs accounting, wherein the method includes the steps of: the accounting device notifying the communication sound control device of an occurrence of specific processing; the communication sound control device receiving the notification of the occurrence of the specific processing from the accounting device; and the communication sound control device notifying one or more order reception communication devices predetermined among the plurality of order reception communication devices of the occurrence of the specific processing in the accounting device.

Another aspect of the present invention is an event occurrence notification method in an inter-communication system comprising: a plurality of order reception communication devices; a communication sound control device that communicates with each of the plurality of order reception communication devices; and a report communication device that is connected to the communication sound control device and reporting to an external network, wherein the method includes the steps of: one of the plurality of order reception communication devices notifying the communication sound control device of an occurrence of an event; the communication sound control device receiving the notification of the occurrence of the event and notifying the report communication device of the occurrence of the event; and the report communication device receiving the notification and transmitting an e-mail notifying of the occurrence of the event to a preset e-mail address via the external network.

Another aspect of the present invention is an event occurrence notification method in an inter-communication system comprising: a plurality of order reception communication devices; a communication sound control device that communicates with each of the plurality of order reception communication devices; a reception device that is connected to the communication sound control device and receives alarm information from a security system; and a report communication device that reports to an external network, wherein the method includes the steps of: the reception device receiving the alarm information from the security system; the communication sound control device notifying an order reception communicating device predetermined among the plurality of order reception communication devices of the reception of the alarm information; and the report communication device transmitting an e-mail notifying of the reception of the alarm information to a preset e-mail address via the external network.

Another aspect of the present invention is an event occurrence notification method in an inter-communication system comprising: a plurality of order reception communication devices; a communication sound control device that communicates with each of the plurality of order reception communication devices; an accounting device that is connected to the communication sound control device and performs accounting; and a report communication device that reports to an external network, wherein the method includes the steps of: the accounting device notifying the communication sound control device of an occurrence of specific processing; the communication sound control device notifying one or more order reception communication devices predetermined among the plurality of order reception communication devices of the occurrence of the specific processing in the accounting device; and the report communication device transmitting an e-mail notifying of the occurrence of the specific processing to a preset e-mail address via the external network.

Advantageous Effects of Invention

In accordance with the present invention, an event recognized by a user of the inter-communication system or an abnormality detected by the security system can be reported to only a specific user(s) of the inter-communication system. Alternatively, an event recognized by a user of the inter-communication system or an abnormality detected by the security system can be shared among all users of the inter-communication system. Furthermore, the occurrence of an abnormal situation can be reported to an external entity without the need of providing any special security device. Also, a specific person(s) can know, in real time or in a short time, processing performed in an accounting device.

As will be described below, the present invention encompasses other aspects. Therefore, the disclosure of the invention is intended to provide part of the present invention and not to limit the scope of the invention described and claimed herein.

DESCRIPTION OF EMBODIMENTS

Figure 1:
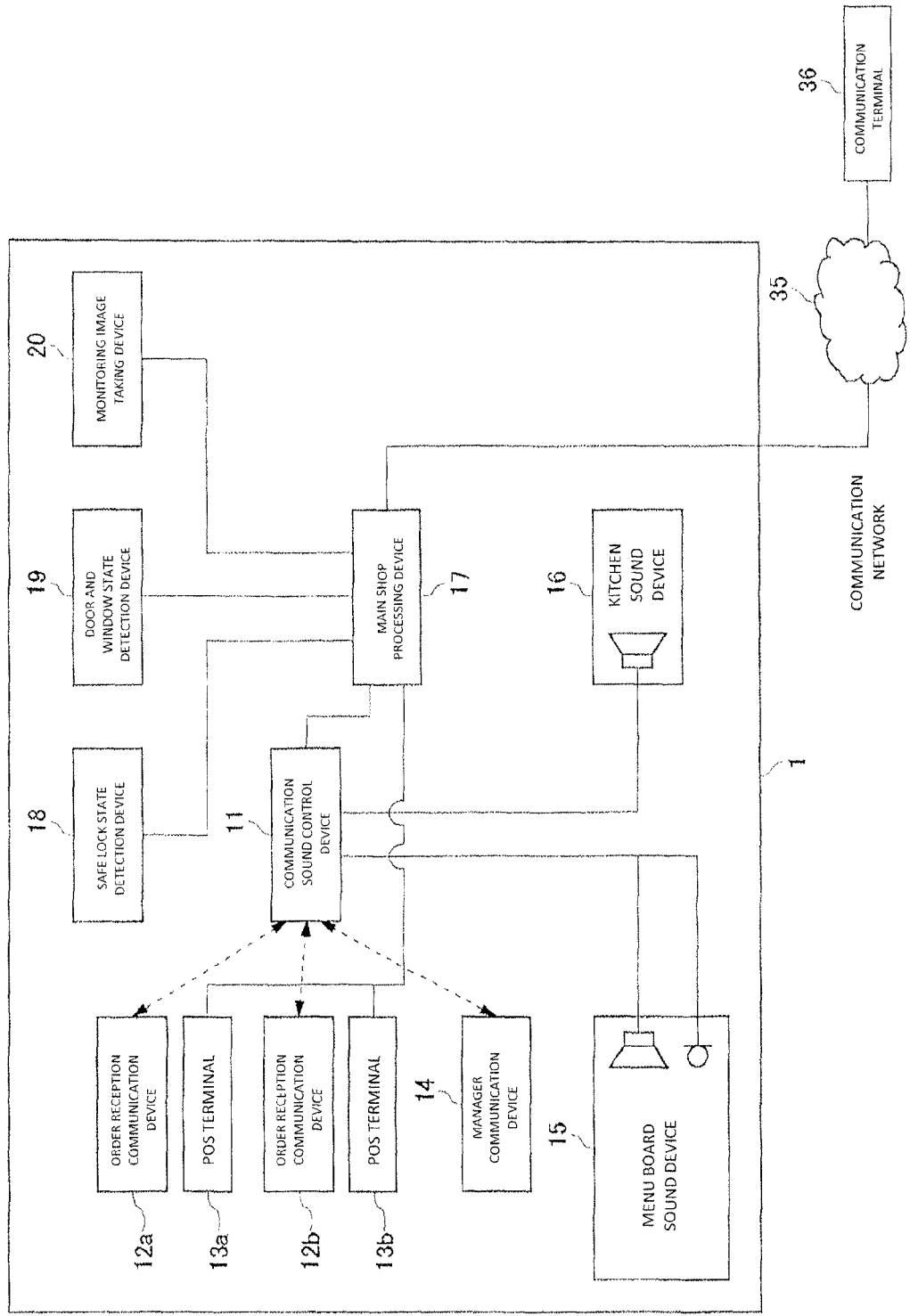
FIG. 1 is a block diagram of a system in which an inter-communication system in an embodiment of the present invention is employed.

The present invention will be described in detail below. Embodiments to be described below are mere examples of the present invention, and the present invention may be modified into various aspects. Therefore, specific configurations and features to be disclosed below are not intended to limit the scope of the claims.

An inter-communication system of the present invention comprises: a plurality of order reception communication devices; and a communication sound control device that communicates with each of the plurality of order reception communication devices, wherein one of the plurality of order reception communication devices notifies the communication sound control device of an occurrence of an event, and the communication sound control device receives the notification of the occurrence of the event and notifies one or more order reception communication devices predetermined among the plurality of order reception communication devices of the occurrence of the event.

With this configuration, an abnormal situation or an event potentially leading to an abnormality occurring in a shop and found by a user of the order reception communication device (an inter-communication equipment) can be reported to a specific person(s) such as a shop manager. If all of the order reception communication devices are designated as recipients of the notification, the occurrence of the event can be recognized by all inter-communication equipment users. In either case, no alarms need to be sounded in the shop while only the inter-communication equipment users can share the occurrence of the event.

Another aspect of the present invention is an inter-communication system comprising: a plurality of order reception communication devices; a communication sound control device that communicates with each of the plurality of order reception communication devices; and a reception device that is connected to the communication sound control device and receives alarm information from a security system, wherein, when the reception device receives the alarm information from the security system, the communication sound control device notifies one or more order reception communication devices predetermined among the plurality of order reception communication devices of the reception of the alarm information.

With this configuration, the abnormal situation is not announced across the floor but can be reported to a specific person(s) such as the shop manager or shared among only inter-communication equipment users, thereby promptly addressed without causing a panic in the shop. As long as a user carries the order reception communication device, the user can recognize the abnormality anywhere within the range of communication with the communication sound control device without the need of providing any special security device. Furthermore, since only a specific person(s) is alerted to the abnormality, influence of any erroneous alarm from the security system can be minimized.

Still another aspect of the present invention is an inter-communication system comprising: a plurality of order reception communication devices; a communication sound control device that communicates with each of the plurality of order reception communication devices; and an accounting device that is connected to the communication sound control device and performs accounting, wherein, when specific processing is performed in the accounting device, the communication sound control device notifies one or more order reception communication devices predetermined among the plurality of order reception communication devices of the occurrence of the specific processing.

This allows a specific person(s) to know, in real time, the processing performed in the accounting device, i.e., an event potentially leading to an abnormality.

Still another aspect of the present invention is an inter-communication system comprising: a plurality of order reception communication devices; a communication sound control device that communicates with each of the plurality of order reception communication devices; and a report communication device that is connected to the communication sound control device and reports to an external network, wherein one of the plurality of order reception communication devices notifies the communication sound control device of an occurrence of an event, the communication sound control device receives the notification of the occurrence of the event and notifies the report communication device of the occurrence of the event, and the report communication device transmits an e-mail notifying of the occurrence of the event to a preset e-mail address via the external network.

With this configuration, an external entity can be alerted to the abnormality in the shop without the use of any special security device. For example, the abnormal situation can even be reported to the manager who is out of the shop or not carrying the order reception communication device.

In the above inter-communication systems, the one order reception communication device may notify the communication sound control device of the occurrence of the event while transmitting data to the communication sound control device for requesting to forcibly disconnect wireless connection with other connecting order reception communication devices and to connect with the one order reception communication device.

With this configuration, the communication sound control device can secure connection with the order reception communication device notifying the communication sound control device of the occurrence of the event, and connection with the other connecting order reception communication devices. This can ensure that the notification of the occurrence of the event is provided from the communication sound control device to the other order reception communication devices.

In the above inter-communication systems, when no wireless transmission channels are available for communication by the one order reception communication device, the one order reception communication device may transmit data to the communication sound control device in response to the occurrence of the event for requesting to connect with the one order reception communication device.

With this configuration, when no wireless channels are available, a wireless channel can be requested and obtained to provide the notification of the occurrence of the event.

The above inter-communication systems may further comprise a control unit that selects either a mode in which sound is sent to the predetermined order reception communication device through an operation on an order reception communication device that has received the notification, or a mode in which sending of sound is determined without requiring an operation on the order reception communication device that has received the notification.

With this configuration, the selective switching between the transmission modes allows flexible sharing of the notification on the basis of business of the shop, on the basis of each shop, or on the basis of unit time of staff's work shifts. For example, the setting may be changed at the time of staff change between a daytime period with many customers and a nighttime period with a few staff members.

In the above inter-communication systems, in response to an operation different from a normal reporting operation in pressing duration and/or in the number of presses performed on an operation unit provided in the one order reception communication device, the control unit may select the mode in which sending of sound is determined without requiring an operation on the order reception communication device that has received the notification.

With this configuration, the staff and the manager can share an evident emergency in a short time, for example an intrusion by many robbers, a person being seriously injured, or discovery of a rapidly spreading fire.

Still another aspect of the present invention is an inter-communication system comprising: a plurality of order reception communication devices; a communication sound control device that communicates with each of the plurality of order reception communication devices; a reception device that is connected to the communication sound control device and receives alarm information from a security system; and a report communication device that reports to an external network, wherein, when the reception device receives the alarm information from the security system, the communication sound control device notifies one or more order reception communication devices predetermined among the plurality of order reception communication devices of the reception of the alarm information, and the report communication device transmits an e-mail notifying of the reception of the alarm information to a preset e-mail address via the external network.

With this configuration, the abnormal situation is not announced across the floor but can be reported to a specific person(s) such as the shop manager or shared among only inter-communication equipment users, thereby promptly addressed without causing a panic in the shop. Also, an external entity can be alerted to the abnormality in the shop without the use of any special security device.

Still another aspect of the present invention is an inter-communication system comprising: a plurality of order reception communication devices; a communication sound control device that communicates with each of the plurality of order reception communication devices; an accounting device that is connected to the communication sound control device and performs accounting; and a report communication device that reports to an external network, wherein, when specific processing is performed in the accounting device, the communication sound control device notifies one or more order reception communication devices predetermined among the plurality of order reception communication devices of the occurrence of the specific processing, and the report communication device transmits an e-mail notifying of the occurrence of the specific processing to a preset e-mail address via the external network.

With this configuration, a specific person(s) can know, in a short time, the processing performed in the accounting device, i.e., an event potentially leading to an abnormality. Also, an external entity can be alerted to the event potentially leading to an abnormality in the shop without the use of any special security device.

An event occurrence notification method in an inter-communication system comprising a plurality of order reception communication devices communicating via a communication sound control device of the present invention includes the steps of: one of the plurality of order reception communication devices notifying the communication sound control device of an occurrence of an event; the communication sound control device receiving the notification of the occurrence of the event from the order reception communication device; the communication sound control device determining an order reception communication device to which the received notification of the occurrence of the event is to be transferred among the plurality of order reception communication device; and the communication sound control device notifying the determined order reception communication device of the occurrence of the event in the inter-communication system.

With this configuration, an abnormal situation or an event potentially leading to an abnormality occurring in a shop and found by a user of the order reception communication device (headset transceiver) can be reported to a specific person(s) such as a shop manager. If all of the order reception communication devices are designated as recipients of the notification, the occurrence of the event can be recognized by all inter-communication equipment users. In either case, no alarms need to be sounded in the shop while only the inter-communication equipment users can share the occurrence of the event.

Another aspect of the present invention is an event occurrence notification method in an inter-communication system comprising: a plurality of order reception communication devices; a communication sound control device that communicates with each of the plurality of order reception communication devices; and a reception device that is connected to the communication sound control device and receives alarm information from a security system, wherein the method includes the steps of: the reception device receiving the alarm information from the security system; and the communication sound control device notifying one or more order reception communication devices predetermined among the plurality of order reception communication devices of the reception of the alarm information from the security system.

With this configuration, the abnormal situation is not announced across the floor but can be reported to a specific person(s) such as the shop manager or shared among only inter-communication equipment users, thereby promptly addressed without causing a panic in the shop. As long as a user carries the order reception communication device, the user can recognize the abnormality anywhere within the range of communication with the communication sound control device without the need of providing any special security device. Furthermore, since only a specific person(s) is alerted to the abnormality, influence of any erroneous alarm from the security system can be minimized.

Still another aspect of the present invention is an event occurrence notification method in an inter-communication system comprising: a plurality of order reception communication devices; a communication sound control device that communicates with each of the plurality of order reception communication devices; and an accounting device that is connected to the communication sound control device and performs accounting, wherein the method includes the steps of: the accounting device notifying the communication sound control device of an occurrence of specific processing; the communication sound control device receiving the notification of the occurrence of the specific processing from the accounting device; and the communication sound control device notifying one or more order reception communication devices predetermined among the plurality of order reception communication devices of the occurrence of the specific processing in the accounting device.

With this configuration, a specific person(s) can know, in real time, the processing performed in the accounting device, i.e., an event potentially leading to an abnormality.

Another aspect of the present invention is an event occurrence notification method in an inter-communication system comprising: a plurality of order reception communication devices; a communication sound control device that communicates with each of the plurality of order reception communication devices; and a report communication device that is connected to the communication sound control device and reporting to an external network, wherein the method includes the steps of: one of the plurality of order reception communication devices notifying the communication sound control device of an occurrence of an event; the communication sound control device receiving the notification of the occurrence of the event and notifying the report communication device of the occurrence of the event; and the report communication device receiving the notification and transmitting an e-mail notifying of the occurrence of the event to a preset e-mail address via the external network.

With this configuration, an external entity can be alerted to the abnormality in the shop without the use of any special security device. For example, the abnormal situation can even be reported to the manager who is out of the shop or not carrying the order reception communication device.

Another aspect of the present invention is an event occurrence notification method in an inter-communication system comprising: a plurality of order reception communication devices; a communication sound control device that communicates with each of the plurality of order reception communication devices; a reception device that is connected to the communication sound control device and receives alarm information from a security system; and a report communication device that reports to an external network, wherein the method includes the steps of: the reception device receiving the alarm information from the security system; the communication sound control device notifying one or more order reception communication devices predetermined among the plurality of order reception communication devices of the reception of the alarm information; and the report communication device transmitting an e-mail notifying of the reception of the alarm information to a preset e-mail address via the external network.

With this configuration, the abnormal situation is not announced across the floor but can be reported to a specific person(s) such as the shop manager or shared among only inter-communication equipment users, thereby promptly addressed without causing a panic in the shop. Also, an external entity can be alerted to the abnormality in the shop without the use of any special security device.

Another aspect of the present invention is an event occurrence notification method in an inter-communication system comprising: a plurality of order reception communication devices; a communication sound control device that communicates with each of the plurality of order reception communication devices; an accounting device that is connected to the communication sound control device and performs accounting; and a report communication device that reports to an external network, wherein the method includes the steps of: the accounting device notifying the communication sound control device of an occurrence of specific processing; the communication sound control device notifying one or more order reception communication devices predetermined among the plurality of order reception communication devices of the occurrence of the specific processing in the accounting device; and the report communication device transmitting an e-mail notifying of the occurrence of the specific processing to a preset e-mail address via the external network.

With this configuration, a specific person(s) can know, in a short time, the processing performed in the accounting device, i.e., an event potentially leading to an abnormality. Also, an external entity can be alerted to the event potentially leading to an abnormality in the shop without the use of any special security device.

Now, an inter-communication system in embodiments of the present invention will be described below with reference to the drawings. FIG. 1 is a block diagram of a system in which the inter-communication system in an embodiment of the present invention is employed.

As shown in FIG. 1, the inter-communication system 100 comprises a communication sound control device 11, a plurality of order reception communication devices 12a and 12b, a plurality of POS terminals 13a and 13b, a manager communication device 14, a menu board sound device 15, a kitchen sound device 16, a main shop processing device 17, a safe lock state detection device 18, a door and window state detection device 19, and a monitoring image taking device 20. The inter-communication system 100 can communicate with a communication terminal 36 over a communication network 35.

The communication sound control device 11 is in wired connection with each of the POS terminals 13a and 13b, the menu board sound device 15, the kitchen sound device 16, and the main shop processing device 17 to communicate with these components. The communication sound control device 11 is also in wireless connection with each of the order reception communication device 12a and 12b and the manager communication device 14 to communicate with these components.

The communication sound control device 11 performs the following processes.

1. The communication sound control device 11 controls wireless connection of bidirectional sound communication and relays bidirectional wireless sound communication with the order reception communication devices 12a and 12b and the manager communication device 14.

2. The communication sound control device 11 bidirectionally transmits voices captured by the menu board sound device 15 for voice communication with a customer driving to the shop, and voices captured by the order reception communication devices 12a and 12b and the manager communication device 14.

3. The communication sound control device 11 transmits, to the kitchen sound device 16, voices captured by the order reception communication devices 12a and 12b and the manager communication device 14, and voices captured by the menu board sound device 15, i.e., interactive voices for an order from a customer.

4. The communication sound control device 11 broadcasts sound from the manager communication device 14 to the order reception communication devices 12a and 12b.

5. The communication sound control device 11 receives an operation (such as a press) on an operation button A on the manager communication device 14 as data. If the order reception communication devices 12a and 12b are in connection, the communication sound control device 11 forcibly disconnects their wireless connection to secure wireless connection available for the manager communication device 14 and connect with the manager communication device 14 (a manager prioritizing process).

6. The communication sound control device 11 receives an operation (such as a press) on an operation button B on the order reception communication devices 12a and 12b and the manager communication device 14 as data, and transmits this information to a device connected to the communication sound control device 11.

7. The communication sound control device 11 receives an operation (such as a press) on the operation button B on the order reception communication devices 12a and 12b and the manager communication device 14 as data, generates corresponding sound in the communication sound control device 11, and selectively transmits the generated sound to the order reception communication device 12a, 12b, and/or the manager communication device 14.

8. The communication sound control device 11 transmits a report via the main shop processing device 17 further to the communication terminal 36 connected to the communication network 35.

9. The communication sound control device 11 transmits and receives data about voice communication, reporting, and shop accounting to and from the main shop processing device 17.

10. The communication sound control device 11 selectively transmits notification sound or control data to a device connected to the communication sound control device 11 at a predetermined time based on a scheduler timer (not shown) provided in the communication sound control device 11.

11. The communication sound control device 11 selectively transmits notification sound to the order reception communication device 12a, 12b, and/or the manager communication device 14 according to data received from the main shop processing device 17.

Figure 4:
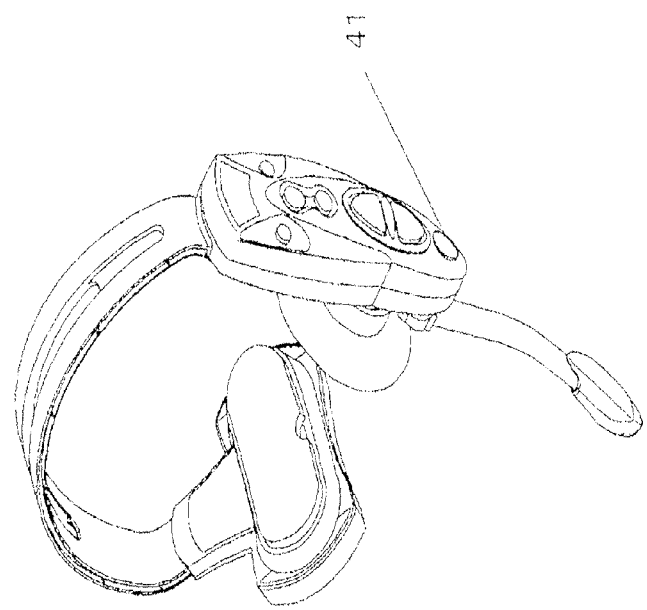
FIG. 4 is an external view of an order reception communication device in an embodiment of the present invention.

FIG. 4 is an external view of the order reception communication devices 12a and 12b. The order reception communication devices 12a and 12b are wearable and comprise a microphone, speakers (including earphones), an operation button B (an operation button 41 in FIG. 4), and a wireless transmission and reception mechanism. When the operation button B is operated (e.g., pressed), the order reception communication devices 12a and 12b transmit alert data to the communication sound control device 11. The microphone converts a voice of the wearer into an audio electric signal. The speakers convert a received audio signal into sound audible to the wearer. The wireless transmission and reception mechanism transmits microphone sound and receives speaker sound to and from the communication sound control device 11.

The manager communication device 14 is carried and operated by a manager who operates the shop. The manager communication device 14 is a kind of order reception communication device of the present invention and has the same configuration and functions as the order reception communication devices 12a and 12b in this embodiment. That is, as with the order reception communication devices 12a and 12b, the manager communication device 14 is wearable and comprises a microphone, speakers (including earphones), an operation button B, and a wireless transmission and reception mechanism. The manager communication device 14 further comprises an operation button A. When the operation button A is operated, the manager communication device 14 transmits, to the communication sound control device 11, data requesting to forcibly disconnect communication with the order reception communication devices 12a or 12b selectively and connect with the manager communication device 14. Functions of the operation button B, the microphone, and the speakers are the same as the order reception communication devices 12a and 12b.

The POS terminals 13 are operated by an order-taker wearing the order reception communication device 12a or 12b or the manager communication device 14 to input details of an order (such as the names, amounts, and sizes of items). The POS terminals 13 have a man-machine interface that includes a touch panel, a display, and a switch (all not shown).

The menu board sound device 15 is an interactive voice interface device interfacing with a customer driving to the shop, and comprises a microphone and a speaker. Typically, the menu board sound device 15 is placed near a visual menu that lists available items. The speaker is connected to the communication sound control device 11 and converts an automated voice such as a welcome message "Hello, can I take your order?" and a voice of an order-taker into sound audible to the customer. The microphone converts an order spoken by the customer into an electric signal.

The kitchen sound device 16 amplifies and outputs an order-taker's voice and/or the manager's voice to a kitchen, which is a work area where ordered items are prepared. When the order-taker and the manager simultaneously speak, their voices are mixed or switched under the control of the communication sound control device 11, and the mixed or switched voices are amplified and output.

The safe lock state detection device 18 detects the open state (which may include the broken state) and the closed state of a lock of a door of a safe. The safe, which is usually opened only by the shop manager on business, stores money from sales and important things related to the shop operation. Besides the lock state of such a safe that stores money, the safe lock state detection device 18 may detect the lock state of a storage that stores important things.

The door and window state detection device 19 detects the open state (which may include the broken state) and the closed state of doors of the shop and windows of shop rooms.

The monitoring image taking device 20 includes a camera that takes images of the inside and outside of the shop, including a pickup window, staff work areas such as the kitchen, doors and their periphery, and where the safe is placed. An image taken by the monitoring image taking device 20 is output as an electric signal. The monitoring image taking device 20 recognizes an abnormality from the image taken and outputs the recognition result as a monitored event. The recognition of an abnormality is not limited to being based on image recognition. An image recording device for recording monitoring images taken, for example a video recorder, may be connected to the monitoring image taking device 20. The image recording device may be activated in response to a monitored event.

Figure 3:
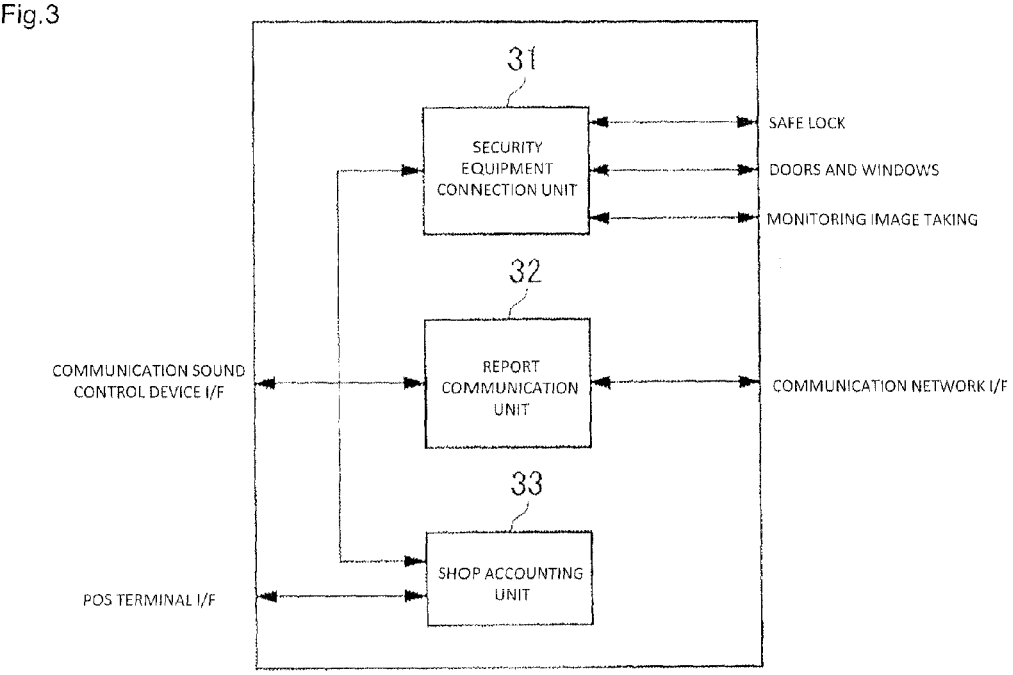
FIG. 3 is a block diagram of a main shop processing device in an embodiment of the present invention.

FIG. 3 is a block diagram of the main shop processing device 17. The main shop processing device 17 includes a security equipment connection unit 31, a report communication unit 32, and a shop accounting unit 33. The safe lock state detection device 18, the door and window state detection device 19, and the monitoring image taking device 20 are connected to the security equipment connection unit 31. The report communication unit 32 is connected to the communication network 35 via a communication network interface. The security equipment connection unit 31, the report communication unit 32, and the shop accounting unit 33 are connected to the communication sound control device 11 via a communication sound control device interface. The shop accounting unit 33 is connected to the POS terminals 13a and 13b via a POS terminal interface. The main shop processing device 17 has the following functions or performs the following processes.

1. The main shop processing device 17 reports to the communication terminal 36 connected to the communication network 35 in response to reception of data from the communication sound control device 11. If the report is configured to be transmitted by e-mail, the main shop processing device 17 has a destination e-mail address stored therein. The e-mail address can be modified through the main shop processing device 17. The main shop processing device 17 generates an e-mail (including a body and a header) to be transmitted. Different destinations may be set for different reporting events (B button, safe, window, door, and monitoring image). The report may also be provided as data transmitted via a network other than e-mail.

2. The main shop processing device 17 receives, from the safe lock state detection device 18, input of the state of the lock of the safe, which is usually opened only by the shop manager on business and which stores money from sales and important things related to the shop operation. If the lock is open, the main shop processing device 17 transmits data indicating the open state to the communication sound control device 11. The main shop processing device 17 also receives, from the door and window state detection device 19, input of the open/closed state or the lock state of the doors and windows inside and outside the shop. If any door or window or its lock is open, the main shop processing device 17 transmits data indicating the open state to the communication sound control device 11. The main shop processing device 17 also receives, from the monitoring image taking device 20 (camera) that takes images of the inside and outside of the shop (including a pickup window, staff work areas such as the kitchen, doors and their periphery, and where the safe is placed), input of a monitored event and outputs control data to monitoring equipment (not shown).

3. The main shop processing device 17 connects with the POS terminals 13a and 13b to perform shop accounting such as daily sales accounting. The main shop processing device 17 then displays the completion of the accounting and outputs the completion to the communication sound control device 11. The main shop processing device 17 has a man-machine interface that includes a keyboard, a pointing device such as a mouse, and a display (all not shown) for the manager to instruct and check the shop accounting.

Figure 2:
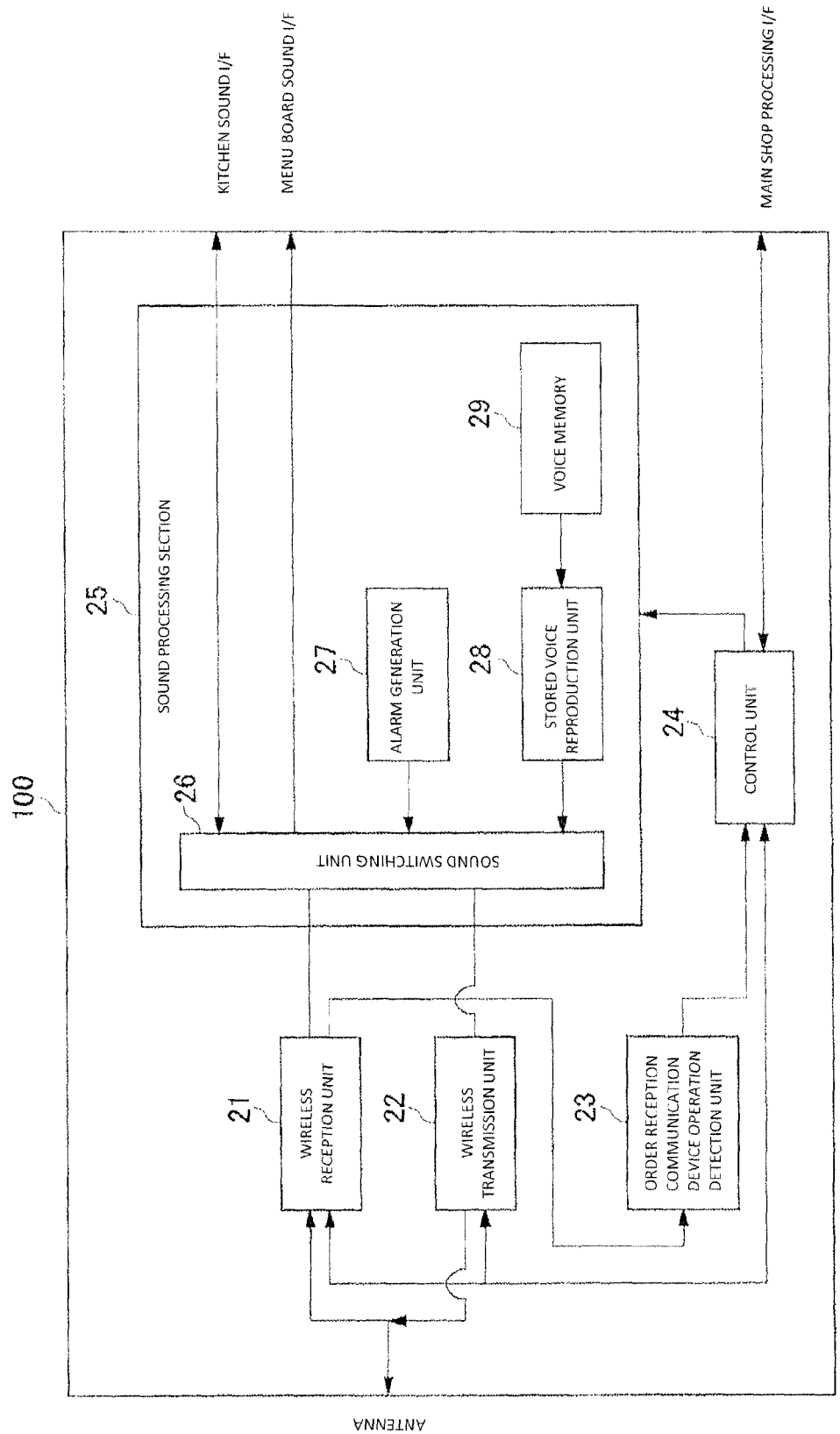
FIG. 2 is a block diagram of a communication sound control device in an embodiment of the present invention.

FIG. 2 is a block diagram of the communication sound control device 11. As shown in FIG. 2, the communication sound control device 11 comprises a wireless reception unit 21, a wireless transmission unit 22, an order reception communication device operation detection unit 23, a control unit 24, and a sound processing section 25.

The wireless reception unit 21 receives audio signals from the order reception communication devices 12a and 12b and the manager communication device 14. The wireless reception unit 21 implements a plurality of sound reception channels. The wireless reception unit 21 performs processes such as reception of wireless connection control, reception of sound, reception and demodulation of data about an operation on an operation button, processing of a baseband signal, and separation of sound and data. The wireless reception unit 21 sends the received sound to the sound processing section 25 and sends the received data about the operation on the operation button to the order reception communication device operation detection unit 23.

The wireless transmission unit 22 performs transmission to the order reception communication devices 12a and 12b and the manager communication device 14. The wireless transmission unit 22 implements a plurality of sound transmission channels. The wireless transmission unit 22 performs processes such as transmission of wireless connection control, control of sound transmission, modulation of a baseband signal, and amplification of high-frequency power. The sound to be transmitted from the wireless transmission unit 22 is input from the sound processing section 25 to the wireless transmission unit 22.

From the received data about the operation on the operation button, the order reception communication device operation detection unit 23 detects that the button A or B has been operated. When the operation is detected, the order reception communication device operation detection unit 23 sends the control unit 24 a corresponding one of an A event indicating that the button A has been operated (the manager prioritizing process) and a B event indicating that the button B has been operated (alert).

The sound processing section 25 comprises a sound switching unit 26, an alarm generation unit 27, a stored voice reproduction unit 28, and a voice memory 29. The sound processing section 25, under the control of the control unit 24, generates an alarm such as a beep through the alarm generation unit 27 and/or reproduces voice data stored in the voice memory 29, and outputs the alarm or the voice data to the sound switching unit 26. Different alarms or reproduced voices may be generated for the A event, the B event, and the types of data from the main shop processing device 17 (the state of the security equipment, completion of the shop accounting, and detection of an event from a monitoring camera image), respectively. The voice data stored in the voice memory 29 may be rewritable through the sound processing section 25.

The sound switching unit 26, under the control of the control unit 24, switches among a received audio signal, an audio signal to be transmitted, an audio signal of an alarm, an audio signal of a reproduced voice, an audio signal to be output to the kitchen sound device, and an audio signal exchanged through the menu board sound device.

The control unit 24 performs the following processes.

1. The control unit 24 receives the A event or the B event from the order reception communication device operation detection unit 23 and controls the sound processing section 25 according to the event type.

2. If the B event (alert) is received, the control unit 24 controls the wireless transmission unit 22 and the wireless reception unit 21 to connect with the manager communication device 14 and to transmit an alarm such as a beep and/or a stored voice to the manager communication device 14. Whether to transmit an alarm or a reproduced voice is preset in the control device.

3. In response to the B event (alert), the control unit 24 outputs the B event to the main shop processing device 17.

4. When no wireless transmission channels are available, that is, when the order reception communication devices 12a and 12b are using all the implemented wireless sound channels, the control unit 24 disconnects the connection with the order reception communication devices 12a and 12b before connecting with the manager communication device 14.

5. When data (the state of the security equipment, completion of the shop accounting, or detection of an event from a monitoring camera image) is input from the main shop processing device 17, the control unit 24 controls the sound processing section 25 to generate or reproduce an audio signal.

6. After transmitting the generated or reproduced audio signal to the manager communication device 14, the control unit 24 performs the above process 4 in response to the B event (alert). The control unit 24 then transmits the audio signal to preset one(s) of the order reception communication devices 12a, 12b, and/or the kitchen sound device 46. At this point, a voice captured by the microphone of the manager communication device 14 may be transmitted to the order reception communication devices 12a, 12b, and/or the kitchen sound device 46, and the B event may be output to the main shop processing device 17 for alerting the communication terminal 36 connected to the communication network 35. Different destinations of the audio signal may be set for the B event and the types of the data from the main shop processing device 17 (the state of the security equipment, completion of the shop accounting, and detection of an event from a monitoring camera image), respectively.

7. The control unit 24 controls the main shop processing device 17. Specifically, the control unit 24 controls the security equipment connection unit 31 to handle the recording of monitoring images, etc.

8. Depending on the B event or the type of the data from the main shop processing device 17 (the state of the security equipment, completion of the shop accounting, or detection of an event from a monitoring camera image), the control unit 24 controls the sound switching unit 26 to switch the input source and the output destination of sound to be transmitted or to be output.

Operation of the inter-communication system configured as above will be described with reference to the drawings.

1. If a User of the Inter-Communication System Notices an Abnormality

If an employee wearing a headset (see FIG. 4), which is the order reception communication device 12a, 12b, notices an abnormality in the shop, the employee presses the operation button 41. The operation button 41 is provided on the headset as an event occurrence notification unit, which is means for notification of the occurrence of an abnormality.

This pressing operation causes the communication sound control device 11 to be notified of the occurrence of the abnormal situation. The communication sound control device 11 detects the press on the operation button 41 through the order reception communication device operation detection unit 23 to recognize the occurrence of the abnormal situation. The control unit 24 instructs the sound processing section 25 to generate an audio signal indicating the occurrence of the abnormal situation. The control unit 24 also indicates the destination of the generated audio signal to the wireless transmission unit 22. The wireless transmission unit 22 transmits the audio signal generated in the sound processing section 25 to the designated destination.

The audio signal may be an alarm or a voice, either of which is selected by the control unit 24. If a voice is selected, an audio signal preregistered in the voice memory 29, for example a signal for generating a voice "An abnormality has occurred," is reproduced by the stored voice reproduction unit 28 and transmitted. If an alarm is selected, an alarm is generated by the alarm generation unit 27 and transmitted.

As the destination of the audio signal, a predetermined one of the order reception communication devices 12a and 12b and the manager communication device 14 is designated by the control unit 24. In this embodiment, the manager communication device 14 used by the manager is designated as the predetermined order reception communication device. As described above, the manager communication device 14 is an order reception communication device with additional manager functions. In this manner, an abnormal situation or an event potentially leading to an abnormality occurring in the shop can be reported to only the manger.

Alternatively, if all the order reception communication devices 12a and 12b capable of communicating with the communication sound control device 11 are set as the destination, an abnormal situation occurring in the shop and noticed by a user of the inter-communication system 100 can be shared among all the users of the inter-communication system 100.

In the process of reporting the abnormality to the manager and transmitting the audio signal, the transmission operation may be selectively switched between two modes: a mode in which sound is transmitted to a designated destination through an operation on the manager communication device 14; and a mode in which transmission of sound directly to a designated destination from the order reception communication device 12a or 12b is determined without requiring an operation on the manager communication device 14. In this case, the control unit 24 in the communication sound control device 11 selectively switches between the two transmission modes. This setting is made by operating a switch provided in the main shop processing device 17 or the manager communication device 14, or is made on the communication terminal 36 via the communication network 35. The switch may be, for example, a switch on the communication sound control device 11 or a button on the manager communication device 14, or may be assigned in the above-described man-machine interface provided in the POS terminals 13a and 13b. The selective switching between the transmission modes allows flexible sharing of the notification on the basis of business of the shop, on the basis of each shop, or on the basis of unit time of the staff's work shifts. For example, the setting may be changed at the time of staff change between a daytime period with many customers and a nighttime period with a few staff members.

By performing a special operation on the operation button different from the above normal reporting operation in pressing duration or in the number of presses, the latter mode may be selected, i.e., the mode in which transmission of sound directly to a designated destination is determined without requiring an operation on the manager communication device 14. The special operation may be, for example, pressing the operation button and holding it for more than a predetermined duration, or repeatedly pressing and releasing the operation button more than predetermined times within a predetermined time period. In this case, the staff and the manager can share an evident emergency in a short time, for example an intrusion by many robbers, a person being seriously injured, or discovery of a rapidly spreading fire. Such a special operation may also cause the latter mode, i.e., the mode in which transmission of sound is determined without requiring an operation on the manager communication device 14, to be selected irrespective of the current mode selected according to the above-described selective switching between the transmission modes.

The control unit 24 notifies the report communication unit 32 in the main shop processing device 17 of the occurrence of the abnormal situation. The report communication unit 32, having received the notification, transmits an e-mail that is preset therein to a preset destination e-mail address via the communication network 35 to report the occurrence of the abnormal situation to an external entity. In this manner, the external entity can be alerted to the abnormality in the shop without the use of any special security device.

In addition, the abnormality can be reported to the external entity even if the manager communication device 14 is out of the range of communication with the communication sound control device 11. Setting the shop manager as the destination allows the abnormal situation to be reported to the manager even if the manager is out of the shop or does not carry the order reception communication device. The abnormal situation may also be reported to the manager through the communication terminal 36 carried by the manager. The control by the control unit 24 may be modified to report only to the external entity via the communication network without alerting the order reception communication devices, or to alert only a specific order reception communication device without reporting to the external entity. For the report to the external entity, a plurality of destinations and their respective report content may be set. This allows the abnormal situation to be shared and thereby promptly addressed. Different destinations may also be set depending on the report content. This allows screening of the report content to prevent unnecessary confusion due to the report content and to facilitate recognition of a report of high priority.

2. If an Abnormality is Detected in a Security System

If an abnormality is detected by any of the safe lock state detection device 18, the door and window state detection device 19, and the monitoring image taking device 20, which are security systems provided in the shop, information indicating the detection of the abnormal situation (hereinafter referred to as "alarm information") is received by the security equipment connection unit 31 of the main shop processing device 17, which is a reception device that receives alarm information from the security system. The received alarm information is transferred to the control unit 24 of the communication sound control device 11. The control unit 24 instructs the sound processing section 25 to generate an audio signal indicating the occurrence of the abnormal situation. Thereafter, processes similar to the above-described case "1. If a user of the inter-communication system notices an abnormality" are performed.

Depending on the alarm information, i.e., the information transferred to the control unit 24, an alarm and a voice may be selected, the content of the voice may be changed, or the destination of the report may be switched between only an external entity and a specific order reception communication device in the shop. For example, for the alarm information from the safe lock state detection device 18 or the monitoring image taking device 20, only the manager in the shop may be alerted. For the alarm information from the door and window state detection device 19, the report may be provided to the manager and an external entity over the communication network. Thus, the destination of the report may be changed as appropriate.

Even for the alarm information from one security system, the destination of the report or alert may be varied with the content of the alarm information, for example detailed content of the alarm information from the safe lock state detection device 18 (e.g., "the lock of the safe has been broken," "the safe remains unlocked for a long time," etc.). With this configuration, the abnormal situation is not announced across the floor but can be reported to a specific person(s) such as the shop manager or shared among only inter-communication equipment users, thereby promptly addressed without causing a panic in the shop.

In addition, as long as a user carries the order reception communication device, the user can recognize the abnormality anywhere within the range of communication with the communication sound control device without the need of providing any special security device. Since the user can be alerted to the abnormal situation while wearing the headset transceiver and serving customers, the user can take action before the trouble expands. Furthermore, since only a specific person(s) is alerted to the abnormality, influence of any erroneous alarm from the security system can be minimized.

3. If Specific Processing is Performed in the Accounting Device

If preset processing is performed in the shop accounting unit 33, which is an accounting device, the occurrence of the specific processing is transferred from the shop accounting unit 33 to the control unit 24. The control unit 24 instructs the sound processing section 25 to generate an audio signal indicating the occurrence of the specific processing in the shop accounting unit 33.

Thereafter, processes similar to the above-described case "1. if a user of the inter-communication system notices an abnormality" are performed. This time, "the audio signal indicating the occurrence of the abnormal situation" is replaced with "the audio signal indicating the occurrence of the specific processing in the shop accounting unit 33." This allows a specific person(s) to know in real time the specific processing performed in the shop accounting unit 33. The specific processing may be processing such as summation of sales. A person such as the manager can know whether the summation has been performed, that is, whether some abnormal situation has possibly impeded the summation. Thus, a specific person(s) can know, in real time, an event potentially leading to an abnormality. The real-time knowledge of the occurrence of the summation allows the manager to check the appropriateness of the summation early.

Thus, the three cases have been described. In the above-described examples, the communication sound control device 11 reports first to the manager communication device 14 upon receiving the B event or the data from the main shop processing device 17 (the state of the security equipment, completion of the shop accounting, or detection of an event from a monitoring camera image). Alternatively, the main shop processing device 17 may simultaneously report to the communication terminal 36 connected to the communication network 35.

In the above-described examples, the alert based on the B event is transmitted first only to the manager communication device 14. Alternatively, the communication sound control device 11 may simultaneously transmit the alert based on the B event to the order reception communication devices 12a and 12b. At this point, the communication sound control device 11 may broadcast the alert to the order reception communication devices 12a and 12b.

In the above-described examples, after the abnormality is reported to and recognized by the manager communication device 14, the abnormality is reported to the order reception communication devices 12a and 12b. Alternatively, besides the order reception communication devices 12a and 12b, the abnormality may simultaneously be reported to the communication terminal 36 connected to the communication network 35.

The reporting to the order reception communication devices 12a and 12b may be selective. A report destination to be selected may be preset, or may be set differently for each of the B event and the types of the data from the main shop processing device 17 (the state of the security equipment, completion of the shop accounting, or detection of an event from a monitoring camera image).

The safe lock state detection device 18, the door and window state detection device 19, and the monitoring image taking device 20 may be connected to the communication sound control device 11 rather than to the main shop processing device 17. In this case, the security equipment connection unit 31 is included in the communication sound control device 11.

Whether to transmit an alarm or a reproduced voice may be set differently for each of the B event and the types of the data from the main shop processing device 17 (the state of the security equipment, completion of the shop accounting, or detection of an event from a monitoring camera image). The correspondences of the alarm or reproduced voice mode and their types to the B event and the types of the data from the main shop processing device 17 may be fixed or rewritable. The correspondences of the alarm or reproduced voice mode and their types to the B event and the types of the data from the main shop processing device 17 may also depend on the condition of the occurrence (such as the frequency of occurrence) of the B event and the data from the main shop processing device 17.

Some or all of the functions of the control unit 24 may reside in the main shop processing device 17. In this case, various data processing capabilities of the main shop processing device 17 may be utilized for control.

Settings for the functional blocks, including the control unit 24, may be made or modified through the main shop processing device 17 and/or the POS terminals 13a and 13b on their man-machine interfaces. In this case, a user can make or modify the settings without the need to leave customers or shop accounting operations. In addition, the user can easily make or modify the settings through the man-machine interface that the user is used to operate in the user's usual work. The settings may also be made or modified from the communication terminal 36. In this case, the manager carrying the communication terminal 36 can make or modify the settings in response to receiving the report. The settings may also be made or modified using the scheduler timer provided in the communication sound control device 11. In this case, the manager can make or modify the settings without leaving the manager's work such as serving customers or performing shop accounting operations. Items are not limited to food, and the kitchen may be any work area where items to be handed are prepared.

The currently conceivable preferred embodiments of the present invention have been described above. Various modifications may be made to the embodiments, and the appended claims are intended to encompass all such modifications that fall within the true spirit and scope of the present invention.

INDUSTRIAL APPLICABILITY

Thus, the inter-communication system according to the present invention, capable of reporting an abnormal situation to a specific user of the inter-communication system, may be useful as an inter-communication system with security functionality.

REFERENCE SIGNS LIST

100 inter-communication system
11 communication sound control device
12a order reception communication device
12b order reception communication device
13a POS terminal
13b POS terminal
14 manager communication device
18 safe lock state detection device
19 door and window state detection device
20 monitoring image taking device
21 wireless reception unit
22 wireless transmission unit
23 order reception communication device operation detection unit
24 control unit
25 sound processing section
26 sound switching unit
27 alarm generation unit
28 stored voice reproduction unit
29 voice memory
31 security equipment connection unit
32 report communication unit
33 shop accounting unit
41 event occurrence notification unit (button B)

The invention claimed is:

1. An inter-communication system comprising:
a plurality of order reception communication devices; and
a control device that communicates with each of the plurality of order reception communication devices, wherein:
when the control device receives alarm information from a security system or notification information from an accounting device, the control device notifies one or more order reception communication devices predetermined among the plurality of order reception communication devices or a preset e-mail address of the reception of the alarm information or the notification information,
the control device comprises a communication sound control device and a reception device that is connected to the communication sound control device, and
when the reception device receives the alarm information or the notification information, the communication sound control device notifies one or more order reception communication devices predetermined among the plurality of order reception communication devices according to the notification information or a preset e-mail address of the reception of the alarm information or the notification information.

2. The inter-communication system according to claim 1, wherein
the security system comprises a camera,
the alarm information is a monitored event as a result of recognition of image taken by the camera.

3. The inter-communication system according to claim 2, wherein
the security system further comprises a image recording device for recording images taken by the camera,
the image recording device is activated in response to the monitored event.

4. The inter-communication system according to claim 1, wherein
the security system comprises a safe lock state detection device,
the alarm information indicates that a safe lock has been broken or the safe lock remains unlocked for a long time.

5. The inter-communication system according to claim 1, wherein
the security system comprises a door and window state detection device,
the alarm information is a detection result of the door and window state detection device.

6. An inter-communication system comprising:
a plurality of order reception communication devices; and
a control device that communicates with each of the plurality of order reception communication devices, wherein:
when the control device receives alarm information from a security system or notification information from an accounting device, the control device notifies one or more order reception communication devices predetermined among the plurality of order reception communication devices or a preset e-mail address of the reception of the alarm information or the notification information,
the control device comprises a communication sound control device and a report communication device that is connected to the communication sound control device and reports to an external network, and
when the communication sound control device receives the alarm information or the notification information, the report communication device transmits an e-mail regarding the alarm information or the notification information to a preset e-mail address via the external network.

7. An inter-communication system comprising:
a plurality of order reception communication devices; and
a control device that communicates with each of the plurality of order reception communication devices, wherein:
when the control device receives alarm information from a security system or notification information from an accounting device, the control device notifies one or more order reception communication devices predetermined among the plurality of order reception communication devices or a preset e-mail address of the reception of the alarm information or the notification information, and
when the control device receives the alarm information or the notification information, the control device forcibly disconnects wireless connection with the order reception communication devices.

8. A notification method in an inter-communication system comprising a plurality of order reception communication devices, a control device that communicates with each of the plurality of order reception communication devices, and a security system or an accounting device, the control device comprising a communication sound control device and a reception device that is connected to the communication sound control device, the method comprising steps of:
the security system or the accounting device detecting an occurrence of an event;
the security system or the accounting device notifying the occurrence of the event;
the control device receiving the notification of the occurrence of the event;
the control device determining an order reception communication device to which the received notification of the occurrence of the event is to be transferred among the plurality of order reception communication devices; and
the control device transferring the notification of the occurrence of the event to the determined order reception communication device, and
when the reception device receives the alarm information or the notification information, the communication sound control device notifying one or more order reception communication devices predetermined among the plurality of order reception communication devices according to the notification information or a preset e-mail address of the reception of the alarm information or the notification information.

9. The notification method according to claim 8, wherein
the security system comprises a camera,
the event is a monitored event as a result of recognition of image taken by the camera.

10. The notification method according to claim 9, wherein
the security system further comprises an image recording device for recording images taken by the camera,
the image recording device is activated in response to the monitored event.

11. The notification method according to claim 8, wherein
the security system comprises a safe lock state detection device,
the event is breaking or opening of the safe lock.

12. The notification method according to claim 9, wherein
the security system comprises a door and window state detection device,
the event is a detection by the door and window state detection device.

13. A notification method in an inter-communication system comprising a plurality of order reception communication devices, a control device that communicates with each of the plurality of order reception communication devices, and a security system or an accounting device, the method comprising steps of:
the security system or the accounting device detecting an occurrence of an event;
the security system or the accounting device notifying the occurrence of the event;
the control device receiving the notification of the occurrence of the event;
the control device determining an order reception communication device to which the received notification of the occurrence of the event is to be transferred among the plurality of order reception communication devices; and
the control device transferring the notification of the occurrence of the event to the determined order reception communication device, wherein:
the control device comprises a communication sound control device and a reception device that is connected to the communication sound control device,
the reception device receives the notification of the occurrence of the event, and the communication sound control device determines and notifies a device to which the notification of the occurrence of the event is to be transferred.

14. An inter-communication system comprising:

a plurality of order reception communication devices; and a control device that communicates with each of the plurality of order reception communication devices, wherein:

when the control device receives alarm information from a security system or notification information from an accounting device, the control device notifies one or more order reception communication devices predetermined among the plurality of order reception communication devices or a preset e-mail address of the reception of the alarm information or the notification information, wherein:

the control device comprises a communication sound control device and a report communication device that is connected to the communication sound control device and reports to an external network, the reception device receives the notification of the occurrence of the event, and the report communication device determines a device to which the notification of the occurrence of the event is to be transferred and transmits an e-mail regarding the occurrence of the event to the determined device via the external network.

* * * * *